(12) United States Patent
Jiang

(10) Patent No.: US 8,195,971 B2
(45) Date of Patent: Jun. 5, 2012

(54) SOLID STATE DISK AND METHOD OF MANAGING POWER SUPPLY THEREOF AND TERMINAL INCLUDING THE SAME

(75) Inventor: Shan Jiang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 305 days.

(21) Appl. No.: 12/544,018

(22) Filed: Aug. 19, 2009

(65) Prior Publication Data

US 2010/0050007 A1 Feb. 25, 2010

(30) Foreign Application Priority Data

Aug. 20, 2008 (CN) .......................... 2008 1 0118744

(51) Int. Cl.
*G06F 1/00* (2006.01)
(52) U.S. Cl. ........................ 713/324; 713/300
(58) Field of Classification Search .................. 713/300, 713/320, 324, 340
See application file for complete search history.

(56) References Cited

U.S. PATENT DOCUMENTS

| | | | | |
|---|---|---|---|---|
| 7,237,133 | B2 * | 6/2007 | Aoki ............................ | 713/324 |
| 7,739,461 | B2 * | 6/2010 | Hur et al. ...................... | 711/158 |
| 2004/0054939 | A1 * | 3/2004 | Guha et al. ................... | 713/300 |
| 2004/0260957 | A1 * | 12/2004 | Jeddeloh et al. .............. | 713/300 |
| 2006/0020765 | A1 * | 1/2006 | Mahrla et al. ................. | 711/170 |
| 2007/0240001 | A1 * | 10/2007 | Syed et al. .................... | 713/300 |
| 2007/0288776 | A1 * | 12/2007 | DeMent et al. ............... | 713/320 |
| 2008/0043562 | A1 * | 2/2008 | Totolos et al. ................ | 365/227 |
| 2009/0031150 | A1 * | 1/2009 | Koga ............................ | 713/300 |
| 2009/0091996 | A1 * | 4/2009 | Chen et al. .................... | 365/212 |
| 2009/0276647 | A1 * | 11/2009 | Boyd ............................ | 713/320 |
| 2009/0300386 | A1 * | 12/2009 | Archer et al. ................. | 713/320 |

FOREIGN PATENT DOCUMENTS

CN 101042608 A 9/2007
* cited by examiner

*Primary Examiner* — Thomas Lee
*Assistant Examiner* — Phil Nguyen
(74) *Attorney, Agent, or Firm* — Patterson Thuente Christensen Pedersen, P.A.

(57) ABSTRACT

A solid state disk and a method for managing power supply of the solid state disk and a terminal including the solid state disk. The solid state disk includes at least one data storage module for storing data, a management module for controlling data operation for said data storage module, controlling said data storage module as an operating power supply state when said data storage module is performing the data operation, and controlling said data storage module as a non-operating power supply state at other times. The data storage module may be enabled as the operating power supply state only when the data operation is performed for a certain data storage module, and the data storage module may be set as the non-operating power supply state when it is in the idle state or after the data operation is completed. Thus, the power consumption of the solid state disk is effectively saved, and the duration of the notebook computer which applies the solid state disk is prolonged.

8 Claims, 3 Drawing Sheets

SOLID STATE DISK AND METHOD OF MANAGING POWER SUPPLY THEREOF AND TERMINAL INCLUDING THE SAME

RELATED APPLICATION

The present application claims priority to Chinese Application No. 200810118744.8 filed Aug. 20, 2008, which is incorporated herein in its entirety by reference.

BACKGROUND OF THE INVENTION

1. Field of the Invention

The present invention relates to the field of storage technology. More specifically, the invention relates to a Solid State Disk (SSD) and a method of a managing power supply thereof, as well as a terminal comprising the SSD.

2. Description of the Prior Art

In the past twenty years, the running frequency of CPUs has increased 600 times, the rotational speed of a hard disk motor has also increased more than 20 times. In addition to the above, even the most important parameter, i.e., capacity, of a storage system has increased ten thousand times. However, along with a huge increase of data capacity, the bottleneck effect of the storage system is evident. In such case, the SSD has been developed.

An SSD is composed of a control unit and a storage unit (FLASH chip), simply, an SSD is a hard disk which is made of the solid state electronic storage chip array. Particularly, there is no mechanical structure, utilizing conventional NAND Flash property so as to perform read-write function in the block writing and erasing manner. The advantages of an SSD are fast speed, large capacity, strong shock resistance and more, as compared to current conventional hard disks. Generally, an SSD is applied to hardware such as a desktop computer, a notebook computer, a mobile device, and a game machine.

SSD is the development direction of the storage field, since the price factors that previously restricted the development of SSDs have changed largely due to applications of SSDs in light and thin notebook computers. In addition to the advantage with respect to bulk and performance, low power consumption is usually a more important factor. However, nowadays the test of duration (standby time) of the notebook computer for SSD and HDD (Hard Disk) is not satisfied. According to one contrast test performed recently, it was impossible to prolong the duration of the notebook computer batteries using an SSD; contrarily, an SSD can decrease the duration of a notebook computer as compared to an HDD. At present, SSD manufacturers will pay more attention to improving capacity, performance and abrasion balancing algorithms such that brings longer used life for SSD, but there is no consideration about decreasing power consumption, so the average power consumption of an SSD is often higher than an HDD.

SUMMARY OF THE INVENTION

In view of the above, the present invention provides an SSD and a method of managing the power supply of the SSD such it that solves the high power consumption problems of existing SSD. Additionally, the present invention further provides a terminal containing an SSD, solving a problem of the decreasing of the duration of the terminal due to the high power consumption of the SSD.

Therefore, the present invention employs the technical solutions as follows.

A solid state disk comprises at least one data storage module for storing data: a management module for controlling the data writing, reading or deleting for the data storage module, controlling the data storage module as a operating power supply state when performing the data operation, and controlling the data storage module as a non-operating power supply state at another time.

The management module comprises an index unit for mapping the logic storage manner of data into a physical storage manner of the data storage module; a data assignment unit for determining the corresponding data storage module according to a solid state disk operation instruction; and a power management unit for controlling the power supply state of the management module, and controlling the data storage module determined by the data assignment unit as the operating power supply state when performing the data operation, and as the non-operating power supply state when the data storage module is idle or after the operation instruction is completed.

Such a solid state disk further comprises a power management setting unit for setting power operating manner of the power management unit as an all-uninterruptable, partly-uninterruptable or an all-automatic manner; and/or setting the power mode output from the power management unit as a complete power-off, idle or busy state; and/or setting the power supply time and interval of the power management unit.

When there are a plurality of the data storage modules, the management module controls a part of the data storage modules as a the operating power supply state, controls the rest of the data storage modules as the operating power supply state only when the data operation is performed, and as the non-operating power supply state at another time.

A method of managing the power of the solid state disk, comprises: receiving a data operation request; determining a data storage module according to the data operation request; setting the determined data storage module as the operating power supply state, controlling the data storage module to perform a data operation; and controlling the data storage module as the non-operating power supply state, after the data operation is completed.

Preferably, the method further comprises a step of controlling the data storage module as the non-operating power supply state under the idle state.

The non-operating power supply state comprises a power off state and a low voltage power supply state.

When there are a plurality of the data storage modules, the method further comprises steps of: controlling a part of the data storage modules as the operating power supply state, and controlling the rest of the data storage modules as the operating power supply state only when the data operation is performed, and as the non-operating power supply state at other time.

Preferably, the method further comprises: setting a power operating manner provided by a power management unit in an all-uninterruptable, partly-uninterruptable or all-automatic manner; and/or setting the power mode output by the data storage module as complete-power off, idle or busy; and/or setting the power supply time and interval of the data storage module.

A terminal comprises a solid state disk and a solid state disk control module, wherein the solid state disk control module is used to provide power to the solid state disk and transmit the data operation instruction to the solid state disk; the solid state disk comprises: at least one data storage module for storing data; a management module for controlling the data storage module to perform a data operation when a data operation instruction is received, controlling the data storage module as a operating power supply state when performing the data writing, reading or canceling, and controlling the data storage module as a non-operating power supply state at other time.

The management module comprises: an index unit for mapping the logic storage manner of data into a physical storage manner of the data storage module; a data assignment unit for determining the corresponding data storage module according to the solid state disk operation instruction; a power management unit for controlling the power supply state of the management module, and controlling the data storage module determined by the data assignment unit as the operating power supply state when the data operation is performed, and as the non-operating power supply state when the data storage module is idle or after completing the operation instruction.

The terminal may be a notebook computer, a desktop computer or an electronic device.

Thus, in the present invention, the data storage module is set as the operating power supply state only when the data operation is performed for a certain data storage module. It is set into the non-operating power supply state when it is in an idle state and after the data operation is completed. There is no power supply to the data storage module which is not operated, thus, the power consumption of the SSD can be saved effectively, and then the duration of the notebook computer which applies the SDD is prolonged. The duration is improved by employing the terminal provided by the present invention, as the power consumption of its solid state disk is decreased.

DETAILED DESCRIPTION

In existing schemes, an SSD only has an idle and a full load state; the power may be provided to all data storage modules, after the SSD is started up, since the SSD uses SLC (Single-Level Cell) flash memory which currently has two states, i.e., the idle and full load state. But SSD only has two states, either in the idle or the full load state. However, in practical applications, each SSD operation only involves one or more data storage modules. Thus, in the present invention, the data storage module is set as the operating power apply state, only when the data operation is performed for a certain data storage module, and it is set as the non-operating power supply state when it is in the idle state and after the data operation is completed. The data storage module which is not operated is set as the non-operating power supply state, thus, the power consumption of the SSD may be saved effectively, and the duration of a notebook adopting the SSD is prolonged. Furthermore, so called operating power supply state refers to providing power to the module normally, so that it can ensure a need for the operation of reading, writing or canceling, whereas, the non-operating power supply state comprises the power off or low voltage power supply state to minimize power consumption. In the following, the non-operating power supply state is illustrated mainly in the power off state, for example.

Various embodiments of the present invention will be described with reference to the figures as follows.

Figure 1:
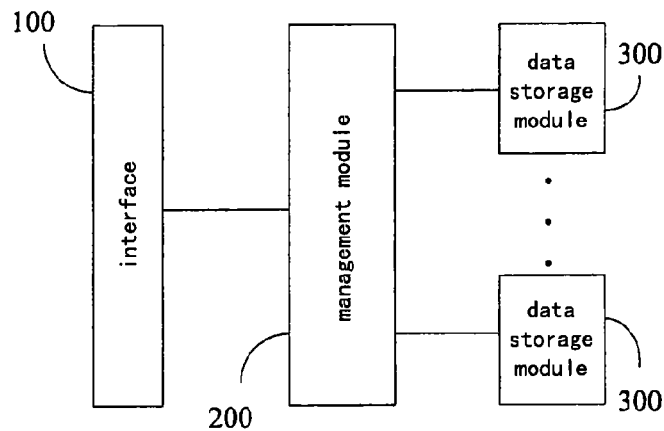
FIG. 1 is an interior structure schematic diagram of an SSD according to a first embodiment of the present invention.

Referring to FIG. 1, an interior structure schematic diagram of an SSD according to a first embodiment of the present invention is shown. The SSD comprises an interface 100, a management module 200 and at least one data storage module 300.

The interface 100 is mainly responsible for the communication between the SSD and the outside, which comprises receiving writing data request, reading out a data request and canceling the data request, and the feedback of the SSD response to outside parts. Additionally, the interface 100 is also responsible for exchanging data with outside parts. Other functions of the interface 100 of the present invention are similar to interface units of prior known SSDs, as will be recognized by those skilled in the art.

The management module 200 is mainly used to control the data storage module 300 to perform the data operation, and the data operation comprises writing, reading or canceling data, etc. Further, the management module 200 is in the uninterruptable power supply state, and controls each data storage module 300 as the power supply state only when it is writing, reading or canceling data, and in the power off state at other times.

The data storage module 300 is mainly used to store data. When the data storage module 300 is in the power off state initially and will perform the write, read or cancel data, it is controlled by the management module 200 as the power supply state and as the power off state at other time.

Assume that there are n data storage modules 300, and determine that only the $i^{th}$ data storage module will be needed to operate. According to this invention, the $i^{th}$ data storage module is powered by the management module 200, and it is powered off after finishing the operation. The remaining data storage modules 200 are not powered, thus refinement of power management for the SSD is implemented, i.e., the power management is performed to each data storage module 200, thus the problem of uniformly powering all data storage modules existing in the prior art scheme may be avoided, the power consumption is saved, so that the duration of the device such as a notebook computer which uses the SSD may be prolonged.

Figure 2:
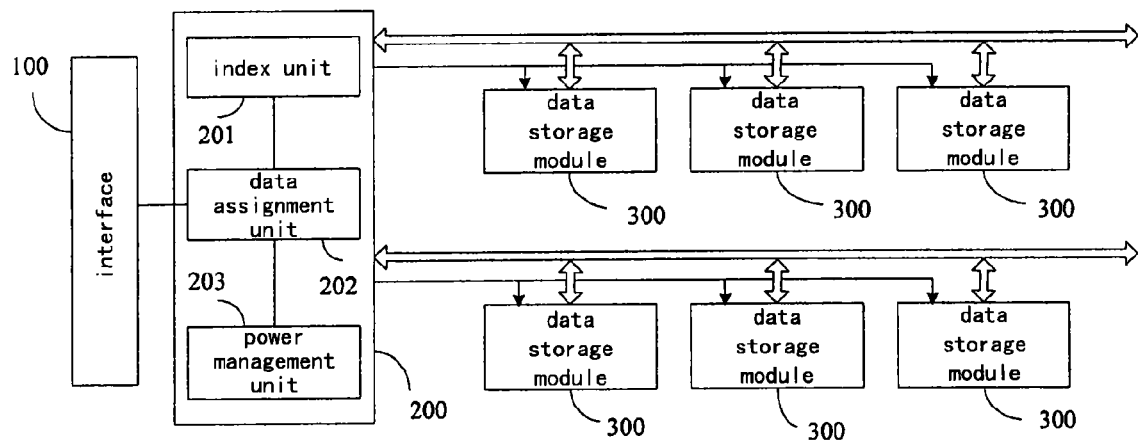
FIG. 2 is an interior structure schematic diagram of an SSD according to a second embodiment of the present invention.

Referring to FIG. 2, an SSD interior structure schematic diagram of an SSD according to a second embodiment of the present invention is shown. The SSD comprises an interface 100, a management module 200 and at least one data storage module 300. The management module 200 comprises an index unit 201, a data assignment unit 202 and a power management unit 203.

The index unit 201 is used to map the logic storage manner of data into a physical storage manner of the data storage module 300.

The data assignment unit 202 is used to determine a corresponding data storage module by the index unit 201 according to the SSD operation instruction received by the interface 100.

The power management unit 203 is used to control the management 200 to be provided the uninterruptable power supply, and control the data storage module 300 determined by the data assignment unit 202 to be provided with the power when the operation instruction is performed, and the data storage module 300 is powered off after the operation instruction has been finished.

Generally, two procedures, the signaling interaction" and "the data exchange," are needed when one data operation of writing, reading or canceling is finished by the SSD. In FIG. 2, a data bus and a control bus are included between the management 200 and the data storage module 300.

As a data reading procedure, for example, the signaling interaction procedure is: the interface 100 receives a reading data request of a user, the request comprising a data description parameter. The interface 100 transmits the reading data request to the data assignment unit 202. The data assignment unit 202 is a kernel unit of the management unit 200. The index unit 201 determines the data storage module 300 to be read according to the data description parameter in the reading data request, and informs the determined solution to the power management module 203. The power management module 203 provides power to the determined data storage module 300 through the control bus. The data exchange procedure is: the data assignment unit 202 transmits a reading command to the above determined data storage module 300, reads the data of the data storage module 300 through the data bus, and finally transmits it to the outside through the interface 100.

As a data writing procedure, for example, the signaling interaction procedure is: the interface 100 receives the writing data request of the user, and the request includes a data description parameter. The interface 100 transmits the writing data request to the data assignment unit 202. The data assignment unit 202 is a kernel unit of the management unit 200, and it determines (one or more) data storage module 300 to be read via the index unit 201 through the data description parameter in the read data request according to the size of the data to be written, and informs the determined solution to the power management unit 203, and power management unit 203 provides power to the determined data storage module 300 through the control bus. The data exchange procedure is: the interface 100 receives the data, transmits it to the data assignment unit 202, and the data assignment unit 202 may write the data into one or more determined data storage module 300 through the data bus.

Figure 3:
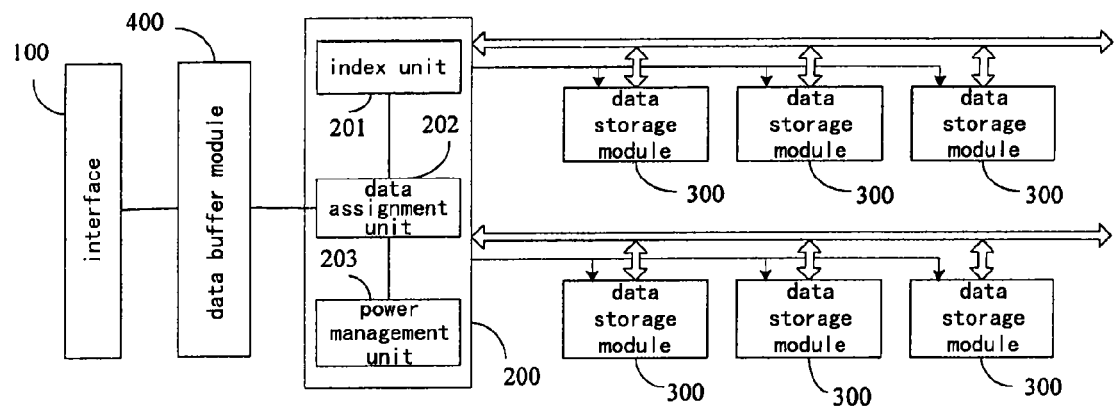
FIG. 3 is an interior structure schematic diagram of an SSD according to the third embodiment of the present invention.

In order to improve the work efficiency of the SDD, a data buffer module 400 may be set therein. Referring to FIG. 3, the structure schematic diagram of an SSD according to the third embodiment is shown. The data read from the data storage module 300 is buffered by the data buffer module 400 firstly and then is transmitted to the outside by the interface 100 when performing the data reading operation. The data received by the interface 100 may be placed in the data buffer module 100 to buffer and then is transmitted to the data storage module 300 when performing the data writing operation.

In addition, in the management module 200, preferably, it also may comprise a power management setting unit (not shown) for setting the power operating manner of the power management unit 203 as all-uninterruptable, partly-uninterruptable or all-automatic manner; and/or, setting the power mode output by the power management unit 203 as complete power off, idle or busy state; and/or, setting the power supply time and intervals (0.1s or 0.01s, etc.) of the power management unit 203. The power management setting unit mentioned above may be separate from the power management unit 203 each other, and also may be integrated in the power management unit 203.

In addition to providing the power to the data storage module 300 which is performing the operation, a power supply management manner may be employed as follows: when there are a plurality of the data storage modules 300, the management module 200 controls a part of the data storage modules 300 to be provided with the uninterruptable power supply, and controls the rest of the data storage modules 300 to be provided with power only when they are operated, i.e., the rest of the data storage modules 300 is/are in the power supply state when the data is written, read or canceled, and in the power off state at other times.

Further, the storage capacity of each data storage module 300 may be the same or different. For example, the capacity of some data storage modules 300 may be 1024 bytes, and the capacity of some other data storage modules 300 may be 2048 bytes.

Moreover, the SSD provided by the present invention has the standard data and the power interface, in order to be compatible with the existing device.

Figure 4:
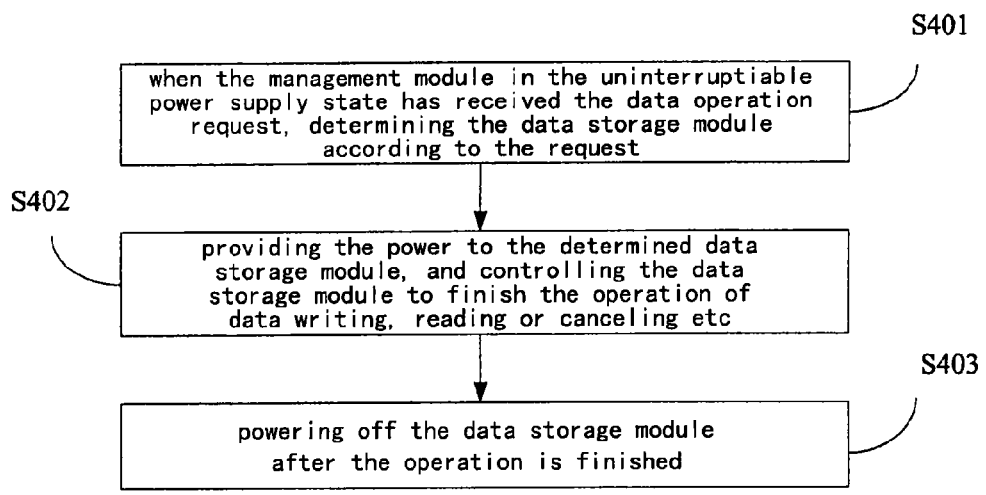
FIG. 4 is a flowchart of an SSD power supply management method according to a first embodiment of the present invention.

The power management method of SSD provided by the present invention will be described as follows. Referring to FIG. 4, the first embodiment of the method comprises the following steps:

S401: after the management module 200 in the uninterruptable power supply state has received the data operation request, determining the data storage module 300 according to the request;

S402: providing the power to the determined data storage module 300, and controlling the data storage module 300 to finish the data operation, wherein the data operation comprises data writing, reading or canceling operation etc;

S403: after finishing the operation, powering off the data storage module 300.

Further, in the idle state, the data storage module is controlled in the power off state.

Moreover, when there are a plurality of the data storage modules, the method further comprises: the management module controlling the parts of the data storage module 300 to be provided with the uninterruptable power supply, and controlling the remaining data storage modules 300 in the power supply state only when the data is written, read or canceled, and in the power off state at other times.

Preferably, the method mentioned above also comprises: setting the power operating manner of the management module as all-uninterruptable, partly-uninterruptable or all-automatic manner.

Furthermore, the power mode outputted from the management module is set as complete power-off, idle or busy state.

The power supply time and intervals of the management module are set.

Figure 5:
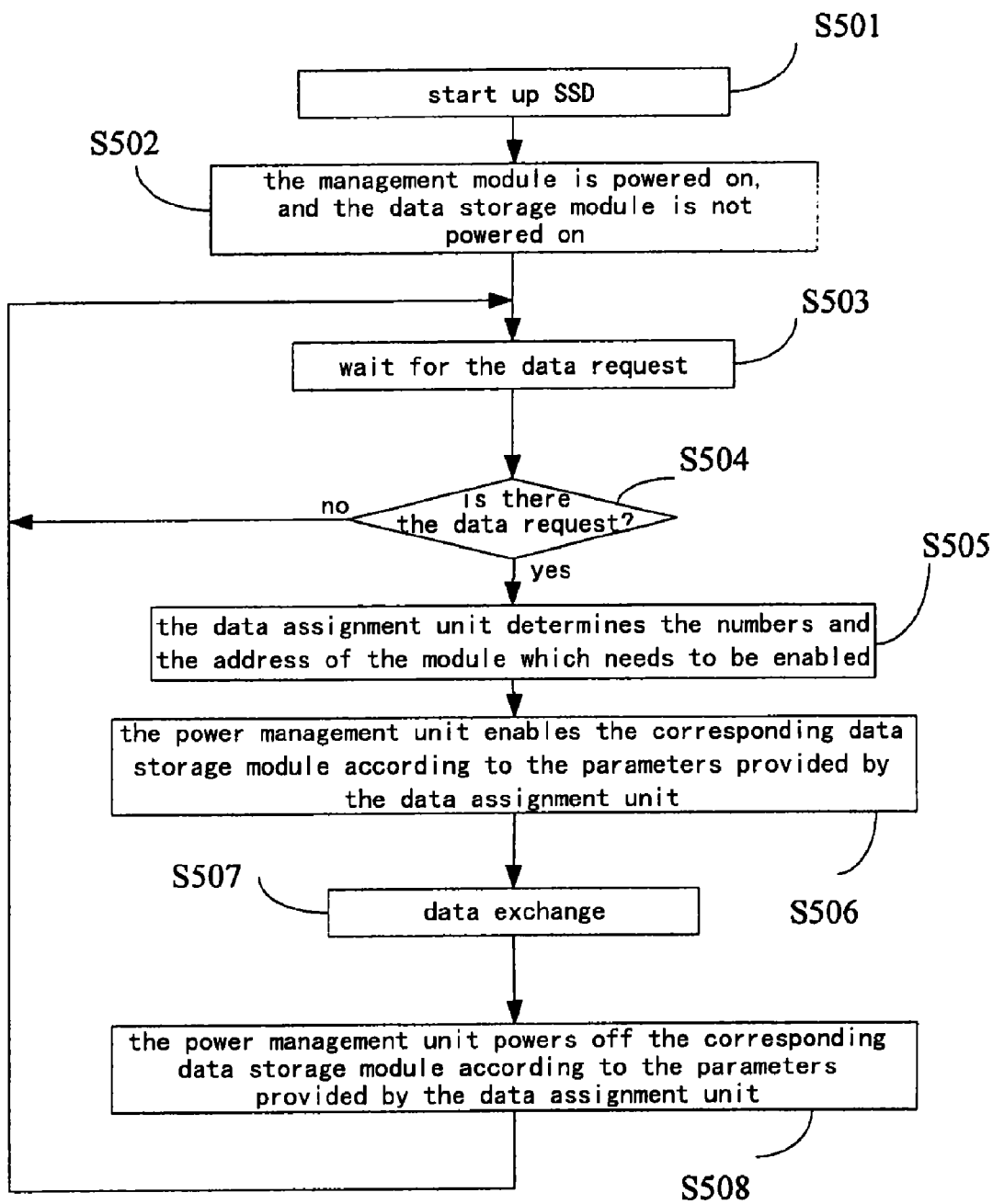
FIG. 5 is a flowchart of an SSD power supply management method according to a second embodiment of the present invention.

Referring to FIG. 5, a flow chart of a second method according to the embodiment, comprises:

S501: starting up the SSD;

S502: powering on the management module 200, but not powering on the data storage module 300;

S503: waiting for the data operation request, including data writing, read or canceling request, etc.;

S504: determining whether there is a data operation request, and if the determination is positive, performing S505, otherwise returning to S503;

S505: the data assignment unit 202 determining the number and the address of data storage module which needs to be enabled through the data description parameters of the data operation request using the index unit 201;

S506: the power management unit 203 enabling the determined data storage module 300 according to the result determined by the data assignment unit 202, i.e., powering on the determined data storage module 300;

S507: performing the data operation procedure, comprising: writing data, reading data or canceling data, etc;

S508: after the power management unit 203 completes the data operation procedure, closing the data storage module 300, i.e., powering off the data storage module 300, then performing S503, waiting for the data operation request.

From the description above, the present invention implements refining the management of the power supply for the SSD, specifically, refining each data storage module 300 or a part of data storage module 300. In the initial state, power is not provided to the data storage module 300; power is provided to the data storage module 300 only when a certain or some data storage module 300 is operated. After operating, the data storage module 300 is powered off, thus the power consumption is saved, and an advantage of the low power consumption of the SDD is really implemented.

Since the power consumption of the SSD of the present invention is decreased, the device such as notebook computer which applies the SSD may improve the duration effectively.

In addition, the present invention also provides a terminal. The terminal is a notebook computer, a desktop computer or an electronic device.

Specifically, the terminal comprises a solid state disk and a solid state disk control module.

The solid state disk control module is used to provide power to the solid state disk and to transmit the data operation instruction to the solid state disk.

The solid state disk comprises: at least one data storage module which is used to store data; a management module which is used to control the data operation for the data storage module when receiving the data operation instruction, control the data storage module as a operating power supply state when performing the data writing, reading or canceling, and control the data storage module as a non-operating power supply state at other times.

The management module comprises: an index unit which is used to map the logic storage manner of the data into a physical storage manner of the data storage module; a data assignment unit which is used to determine corresponding data storage module according to the solid state disk operation instruction; and a power management unit which is used to control the power supply state of the management module, and control the data storage module determined by the data assignment unit as the operating power supply state when performing the data operation, and as the non-operating power supply state when the data storage module is idle or after completing the operation instruction.

The duration is improved by employing the terminal provided by the present invention, as the power consumption of the solid state disk is reduced.

Those skilled in the art will understand that the procedure of the method which implements the embodiment above may be implemented by the hardware associated with the program instruction, the program may be stored in a readable storage media, the corresponding steps in the method above are performed when the program is performed. The storage media is, for example a ROM/RAM, a disc, a CD, etc.

It should be noted that the foregoing embodiments are only particular embodiments. It will be understood by those skilled in the art that various changes and improvements may be made without departing from the principle of the present invention, and these changes and improvements may be considered as within the protective scope of the present invention.

What is claimed is:

1. A solid state disk, comprising:
   at least one data storage module which stores data; and
   a management module which controls said data storage module to perform a data operation, controls said data storage module as an operating power supply state when performing the data operation, and controls said data storage module as a non-operating power supply state at other times;
   wherein said management module comprises:
   an index unit which maps a logic storage manner of the data into a physical storage manner of said data storage module;
   a data assignment unit which determines the corresponding data storage module according to a solid state disk operation instruction;
   a power management unit which controls a power supply state of said management module, and controls the data storage module determined by said data assignment unit as said operating power supply state when said data operation is performed, and as said non-operating power supply state when the data storage module is idle or after said data operation is completed; and
   a power management setting unit which sets the power operating manner of said power management unit as all-uninterruptable, partly-uninterruptable or all-automatic manner; and/or sets the power mode output from said power management unit as complete power-off, idle or busy state; and/or, sets the power supply time and intervals of said power management unit.

2. The solid state disk of claim 1, wherein
   when there are a plurality of the data storage modules, said management module controls a part of the data storage modules as the operating power supply state, controls the rest of the data storage modules as the operating power supply state only when the data operation is performed, and as the non-operating power off state at other times.

3. A method of managing the power of the solid state disk comprising:
   receiving a data operation request;
   determining a data storage module according to the data operation request;
   setting the determined data storage module to be in an operating power supply state, and controlling said data storage module to perform a data operation; and
   controlling said data storage module in a non-operating power supply state, after said data operation is completed;
   wherein said controlling further comprises:
   mapping a logic storage manner of the data into a physical storage manner of said data storage module;
   determining a corresponding data storage module according to the solid state disk operation instruction;
   controlling a power supply state of said management module, and controlling the data storage module determined by said data assignment unit as an operating power supply state when said data operation is performed, and as a non-operating power supply state when the data storage module is idle or after said data operation is completed; and
   setting a power operating manner provided by a power management unit as all-uninterruptable, partly-uninterruptable or automatic manner; and/or
   setting the power mode output from said power management unit as complete power-off, idle or busy state; and/or
   setting the power supply time and intervals of said power management unit.

4. The method of claim 3, further comprising: controlling said data storage module as the non-operating state under the idle state.

5. The method of claim 3, wherein said non-operating power supply state comprises a power off and a low voltage power supply state.

6. The method of claim 3, wherein when there are a plurality of data storage modules, further comprising:
controlling a part of the data storage modules as the operating power supply state, and controlling the rest of the data storage modules as the operating power supply state only when the data operation is performed, and as the power off state at other times.

7. A terminal comprising a solid state disk and a solid state disk control module, wherein
said solid state disk control module provides power to said solid state disk and transmits the data operation instruction to the solid state disk;
said solid state disk comprises:
at least one data storage module which stores data; and
a management module which controls the data storage module to perform a data operation when a data operation instruction is received, controls the data storage module as an operating power supply state when performing the data writing, reading or canceling, and controls the data storage module as a non-operating power supply state at other times;
wherein the management model includes:
an index unit which maps the logic storage manner of the data into a physical storage manner of said data storage module;
a data assignment unit which determines corresponding data storage module according to the solid state disk operation instruction; and
a power management unit which controls a power supply state of said management module, and controls the data storage module determined by said data assignment unit as the operating power supply state when performing said data operation, and as the non-operating power supply state when the data storage module is idle or after completing the operation instruction; and
a power management setting unit which sets the power operating manner of said power management unit as all-uninterruptable, partly-uninterruptable or all-automatic manner; and/or sets the power mode output from said power management unit as complete power-off, idle or busy state; and/or, sets the power supply time and intervals of said power management unit.

8. The terminal of claim 7, wherein said terminal is a notebook computer, a desktop computer or an electronic device.

* * * * *